Nov. 15, 1966   C. H. BUTCHER, JR   3,285,431
GUIDE ROLL ASSEMBLY FOR TELESCOPIC BOOM
Filed April 30, 1965   2 Sheets-Sheet 1

INVENTOR.
CHARLES H. BUTCHER, JR

BY *Pennie, Edmonds,*
*Morton, Taylor and Adams*
ATTORNEYS

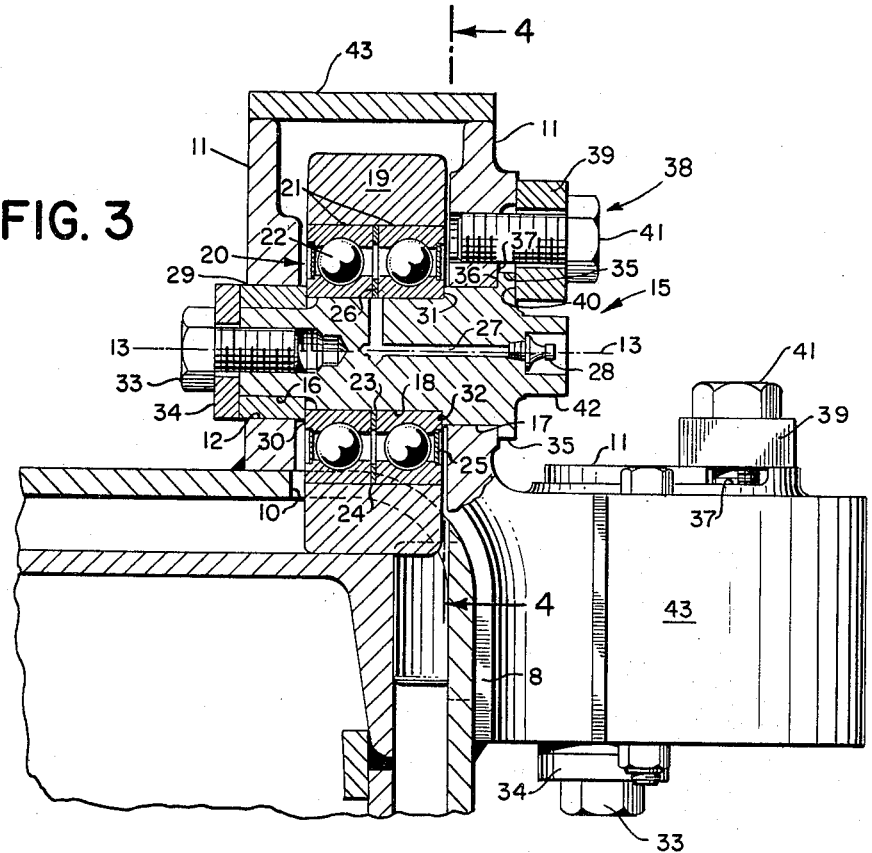
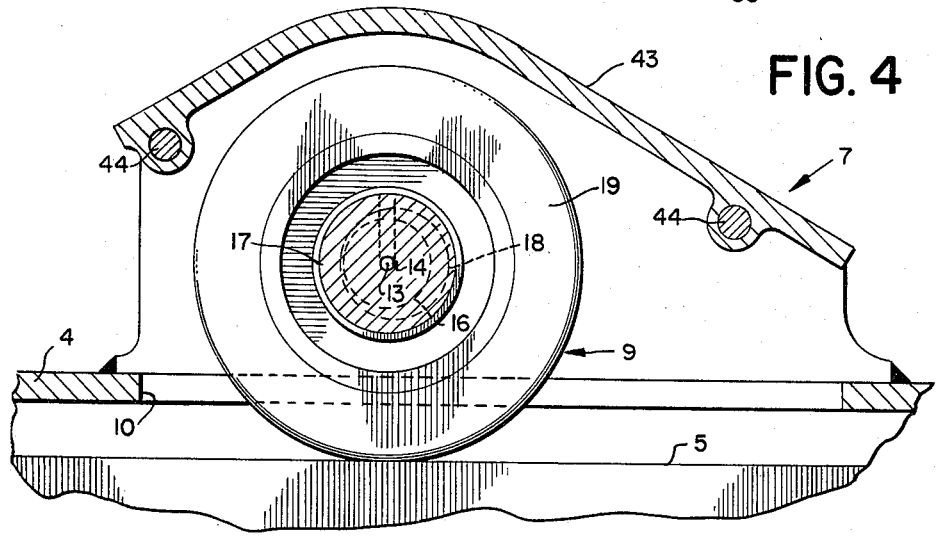

3,285,431
GUIDE ROLL ASSEMBLY FOR TELESCOPIC BOOM
Charles H. Butcher, Jr., Marion, Ohio, assignor to Universal Marion Corporation, Jacksonville, Fla., a corporation of Florida
Filed Apr. 30, 1965, Ser. No. 452,150
8 Claims. (Cl. 212—55)

The present invention relates to a guide mechanism for telescopic boom assemblies of the type included in earth working equipment where a working implement is attached to the free end of the boom, and more particularly, this invention is directed to an adjustable roller guide construction for facilitating telescopic motion of one of the telescopic members of the boom with respect to another and for permitting adjustment of the longitudinal alignment of the boom members.

In earth working machinery employing a telescopic boom assembly comprised of a plurality of boom sections telescopically mounted within each other, it is necessary to include some bearing mechanism for permitting extension and retraction of the boom members. In providing such mechanism, however, care must be taken to assure that the telescopic members are longitudinally aligned relative to each other. Misalignment of the boom members can have a destructive effect on the boom assembly and this is particlularly true where for purposes of compactness, the overall cross-sectional dimension of the boom is kept as small as possible. This compactness is frequently effected by providing, among other things, a minimum transverse spacing between the boom members, and it is apparent that with a minimum spacing, any misalignment of an appreciable amount will cause the boom members to rub against each other during their telescoping movement. Also, where any of the power transmission mechanism used, for example, for extending and retracting the boom members or for actuating the working implement at the free end of the boom is to be located within the boom structure, misalignment will tend to cause such mechanism to interfere with the telescopic action of the boom and this, in turn, could also result in injury to this mechanism.

Even with a telescopic boom construction in which the individual boom members are initially aligned properly with respect to each other, use of the machine, particularly under heavy loading conditions, will tend to cause wear on the active bearing surfaces of the telescoping boom member and as a result upset the original alignment of the assembly. To overcome these disadvantages, conventional boom assemblies have been provided with bearing mechanisms that are adjustable with respect to the individual boom members so that any misalignment developed during use of the machine may be corrected by changing the position of the bearing mechanism relative to the boom members. For example, with a telescopic boom assembly having an inner tubular member telescopically mounted within an outer tubular member, the bearing mechanism for the assembly may be comprised of a plurality of roller assemblies adjustably secured onto the outer boom member in such a way whereby they may be moved laterally or transversely of the boom's longitudinal axis for taking up any play between the inner and outer members.

One type of adjustable roller mounting employs a shaft upon which the roller is mounted and a radially extending flange fixed to the end of the shaft. The flange is, in turn, provided with a series of holes oriented about the axis of the roller and at varying distances therefrom. With this arrangement, the transverse positioning of the roller with respect to the outer boom member is determined by the particular hole in the flange that is employed to secure it to the outer boom member. It will be apparent, however, that the adjustment afforded with this construction is not precise since the transverse movement of the rollers must be made in incremental amounts as opposed to a continuous type of adjustment, and the smallest increment available for adjustment will be determined by the angular spacing between two adjacent holes.

Another type of incremental adjustment can be obtained by a serrated, or splined end crank pin which is held in a companion serrated washer on the outer boom member by means of a bolt or key retainer. Here, the smallest increment available is determined by the angular spacing between two adjacent serrations or splines and again no continuous type of adjustment of the roller assembly is possible.

In addition to the fact that these conventional boom guide assemblies are capable of only incremental adjustments, they are also expensive to manufacture due to the machining required and are subject to fatigue under heavy loads due to shearing forces developed at the joint connections.

In accordance with the teachings of the present invention, the disadvantages of these prior constructions are overcome by providing an adjustable guide assembly that may be held in various operative positions on the boom by clamping of the assembly to the outer boom member under a simple frictional force. With this construction, the holding of the assembly in its original position on the boom is not dependent on the shear strength of the materials employed in the assembly as is generally the case with incremental adjustment constructions. In addition, this frictional type of clamping provides an infinite position adjustment of the roller assemblies as opposed to the incremental adjustments possible with the prior constructions described above. Accordingly, the individual boom members of the complete boom assembly may be precisely aligned upon original assembly and precisely realigned in the event that any play is developed during use of the boom.

Generally, the adjustable guide assembly of the present invention includes a roller bearing mechanism mounted on a crank shaft which is, in turn, mounted on the outer boom assembly for rotation about an axis eccentric to the axis of the roller. A plurality of these assemblies are spaced about the circumference of the boom and longitudinally thereof and the individual rollers of the assemblies extend inwardly of the outer boom member into rolling engagement with the inner member. For clamping the individual roller mechanisms in the desired positions, the crank pin of each mechanism is provided with a radially extending flange that is frictionally held in the desired position of rotation about the axis of the crank shaft by frictionally clamping it to the outer boom structure.

Due to the eccentric mounting of the roller mechanisms on their respective crank shafts, rotation of these shafts will cause the rollers to move transversely or laterally with respect to the longitudinal axis of the boom and thus, by engagement with the inner boom member, the relative positioning of these rollers will control the longitudinal alignment of the boom members. Also, with the frictional clamping, an infinite position type of adjustment of the roller mechanisms is provided where to change the position of any one of the roller mechanisms, it is simply necessary to loosen the associated clamping means, rotate the crank shaft the desired amount, and retighten the clamping means to frictionally lock the crank pin flange to the outer boom structure.

In addition to the infinite adjustment control afforded by the construction of the present invention, additional advantages reside in the simplicity of the bearing mechanism and the cost savings that are present over conventionally constructed guide assemblies. In conventional constructions, the materials from which the bearing surfaces are made must be selected for strength and wear durability requirements. With the construction of the present invention, the infinite adjustment of the bearing mechanism permits fabrication of the telescopic boom members without machining of the bearing surfaces that define the roller paths. Accordingly, larger manufacturing tolerances of the boom members are permissible and the adjustable bearings of the present invention can be relied upon to compensate for these errors.

In addition, the construction of the present invention takes into consideration the fact that dust, mud, sand, and water will be on and around the telescopic boom and guide assemblies, that falling rocks will strike the external parts and that the external parts will strike obstructions.

A more complete understanding of the present invention, including the construction of the preferred embodiment, will be obtained from a reading of the following detailed description with reference being made to the accompanying drawings of which:

FIG. 3 is a cross-sectional view taken along lines 3—3 of FIG. 2; and

FIG. 4 is a cross-sectional view taken along lines 4—4 of FIG. 3.

Figure 1:
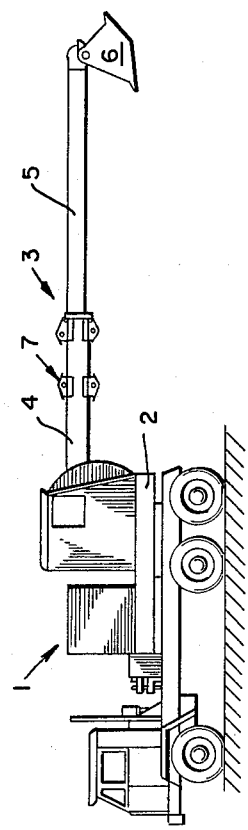
FIG. 1 is a side elevational view of an earth working machine showing a two-part telescopic boom assembly.
Figure 2:
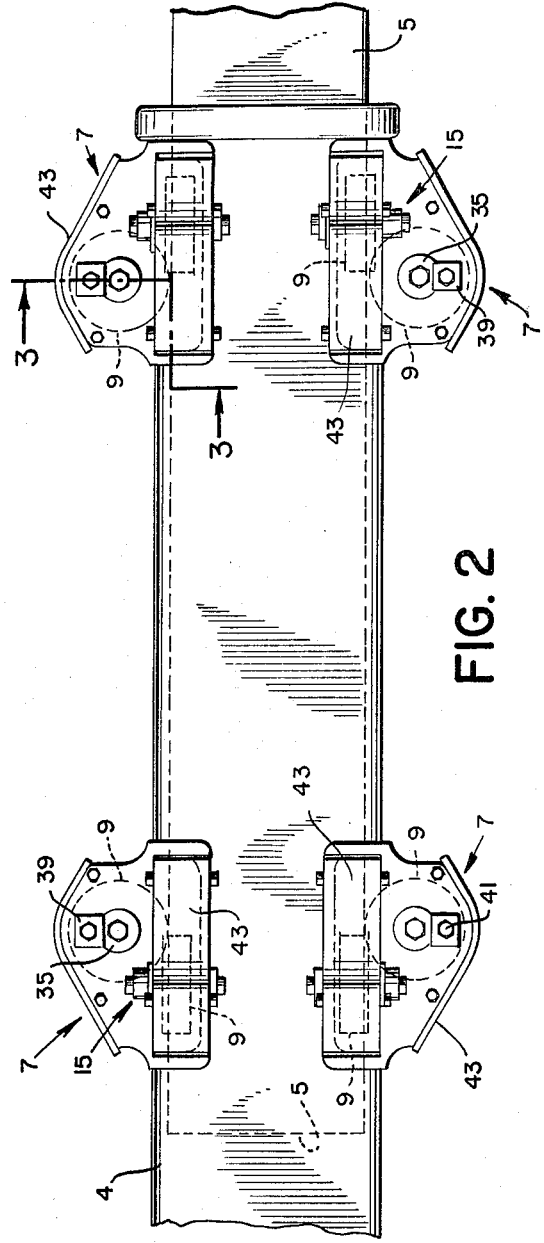
FIG. 2 is an enlarged view of a portion of the boom assembly shown in FIG. 1.

As shown in FIG. 1, a suitable earth working machine in which the boom and adjustable guide roller assembly of the present invention may be included comprises a wheeled truck 1 having a turntable 2 rotatably mounted on the back end thereof. The boom assembly generally designated at 3 is mounted on this turntable for movement through a working stroke which may include pivoting in a vertical plane about a horizontal axis, rotation about the longitudinal axis of the boom and telescopic motion of the boom itself. Also, at the free end of the boom member 5, a working implement such as a bucket 6 is pivotally connected.

For effecting the telescopic motion of the boom, it is constructed with an outer tubular member 4, an inner tubular member 5 telescopically received therein, and guide roller assemblies generally designated at 7. As shown in the drawings, the inner and outer boom members are generally square-shaped in cross section. Accordingly, it is preferable to include guide roller assemblies at each corner of the boom about its periphery as shown in FIG. 3. Also, to further support the inner boom member, another group of these guide or bearing assemblies are attached to the outer boom member at a point spaced longitudinally of the boom. Thus, the guide assemblies are arranged on the boom so that they provide both a rear and forward support for the inner telescoping boom member 5 in both the vertical and horizontal planes.

These guide assemblies are all of identical construction and as shown in FIG. 3, each of them includes a saddle or housing member 8 fixed to the outer boom, as by welding, and a pair of roller bearing members 9 extending through openings 10 in the outer boom and into a rolling or bearing contact with the inner boom member 5. The two roller bearings of each of these assemblies are mounted in the same fashion except, of course, that they are positioned at angles with respect to each other. The mounting for each of these roller bearings permits continuous, as opposed to incremental, adjustment such that the rollers may be moved, within the limits of the mechanism, to any desired position inwardly of the outer boom to properly engage the inner boom member and hold the latter in parallel alignment with the outer boom member.

For mounting the roller bearings 9 of each guide assembly onto the outer boom member in this manner, a pair of spaced support members 11 are secured to the housing member 8. These support members are provided with aligned journal openings 12 having a common predetermined longitudinal axis 13. A roller bearing is adapted to be positioned between these support members for rotation about an axis 14 which is parallel to, but offset from, the axis 13; and a crank pin 15 is employed for holding the roller bearing in position. As shown, the pin includes end journals 16 and 17 formed concentrically about a common axis and an intermediate portion disposed between these journals for defining a cylindrical bearing support surface 18 which, as seen from FIG. 4, is eccentric to the journal surfaces 16, 17. As more fully described below, rotation of the crank pin 15 about the axis 13 when positioned in the support members 11 will cause lateral translation of the roller bearing 9 towards and away from the inner boom member.

In order to assemble the bearing onto the outer boom member between the supports 11, the roller element 19 of the unit is first provided with a pair of bearings 20, each of which is comprised of the inner and outer races 21, 21', balls 22, intermediate shim members 23, 24 and end retaining shields 25. The bearings are press-fit into the roller 19 with the shims in between the bearings. Additional retention of the bearings within the roller is obtained by staking the roller bore adjacent to the bearing. This provides a simple method in bearing retention which is less expensive than other methods of bearing retention requiring snap rings, threaded bearing nuts or the like. Also, the present construction requires less space than those where, for example, bearing nuts are required.

Each of the guide rollers, after it is provided with the bearings 20, is then assembled onto the respective housing 8 by first positioning it between the support members 11 and thereafter passing the crank pin 15 through the openings in the support member and the opening defined by the inner races of the roller. As shown in FIG. 3, the inner shim 24 is provided with a slot 26. This slot is aligned with a lubricating passageway 27 extending through the crank pin 15 so that the bearing may be lubricated through the fitting 28 connected to the end of the crank pin 15.

The bearing support surface 18, as well as the journal surfaces 16, 17, are slip fitted within the respective mating parts of the assembly; and for securing the inner races of the bearings 20 against rotation with respect to the crank pin, a sleeve member 29 is provided. This sleeve member is slidably positioned over the journal end 16 of the crank pin 15 and, in turn, holds this end of the crank pin rotatably within the corresponding support member 11, the sleeve itself being slip fitted within the corresponding journal opening 12. The sleeve 29 engages one end 30 of one of the inner races 21 while the opposite end 31 of the other inner race abuts against a ledge 32 formed on the crank pin 15 by the separation of the journal surface 17 from the bearing support surface 18.

After the crank pin is assembled in the support members 11 with the sleeve 29 disposed over the journal surface 17, a compressive force is exerted against the inner race members to clamp them against the ledge 32. This force is applied by the tension fastening element 33 which is threaded into the end of the crank pin 15. A washer 34 is employed for engaging the sleeve 29 as the tension element is threaded into the end of the crank pin. Thus, the guide roller 19 is fixed in axial location on the crank pin by the inner race clamping and the press fit of the outer race into the roller. The shims 23, 24 prevent pre-loading of the bearings 20 when their races are clamped as well as provide a lubricating passageway and cavity. This is a simple, economical, compact, strong, and trouble free method of mounting as compared to other methods which utilize external threads on the shaft for a bearing nut or employ snap rings and corresponding grooves which are more readily subject to damage and require considerably more space.

In accordance with the teachings of the present invention, the crank pin of each assembly is retained axially in the respective housing member 8 in various positions of rotation about the axis 13 by means of the flange 35 which has a clamping surface 36 facing and resting against cooperating clamping surface 37 on one of the support members 11. In order to hold this flange member against the surface 37, a selectively operable clamping means generally designated 38 is provided. This clamping means comprises an annular member 39 having a portion 40 overlying a portion of the flange member 35 and a tension fastening element 41 in the form of a cap screw. This tension fastening element extends through the opening in the annular member 39 and is threaded into a tapped hole in the support member 11 as shown in FIG. 3. By tightening the element 41, the flange 35 of the crank pin will be held between the annular member 39 and cooperating surface member 37 of the support member 11 and since the clamping mechanism holds the crank pin against rotation within the support members 11 by a simple clamping action, it is possible to rotate the crank pin to any desired extent and thereby precisely position the rollers 19 relative to the inner boom member. This, in turn, assures that a proper alignment of the boom members relative to each other can be obtained. The range of adjustment of the rollers is determined by the limits of the eccentricity and as is apparent from FIG. 4, the maximum lateral movement of the rollers will be equal to twice the spacing between the axes 13 and 14.

The degree to which the tensioning element 41 need be tightened in order to maintain the angular position of the crank pin is, of course, dependent on the loads which will be received by the boom, and in particular, the loads received by the free working end of the boom. Tightening of the cap screw 41 to a specified torque produces a predetermined tension in the cap screw and thus a known clamp load is produced on the flange of the crank pin. This load when multiplied by the coefficient of friction of the materials from which the surfaces 36, 37 are composed will be a force F. This force is directed along a line extending perpendicular to the axis 13 in a plane defined by the surfaces 36, 37 and is spaced from the axis 13 by a radial distance R.

As the earth working machine performs a working operation, a maximum working load L is transmitted to the crank pin in the plane of the roller 19, perpendicular to the crank pin axis, and at a radial distance E from the axis 13 where E is the maximum eccentricity of the crank pin.

In order that the crank pin may be held in any particular angular position about the axis 13, the frictional moment produced by the clamping mechanism must be equal to or greater than the working moment developed by the loading of the boom. In other words, using the symbols defined above:

$$F \times R \geq L \times E \text{ or}$$
$$F \times R = L \times E \times k$$

where $k$ is a factor of safety.

From this, it will be seen that the clamping force necessary to releasably secure or lock the roller in any adjusted position is a frictional force and is not dependent on the shear strength of the materials involved. In addition, this friction type of clamping provides an infinite position adjustment for each of the guide assemblies within the limits of their eccentricity.

In addition, the simple ball bearing retention and crank pin retention of the present invention requires only a simple machining of the housing 8 on the surface facing the clamping flange of the crank pin. Also, only one broad diameter through both of the support members 11 is required and only a single tapped hole is necessary for receiving the tension element 41.

As mentioned above and as shown in FIG. 3, the housing 8 of each bearing assembly holds two rollers 19 which are disposed at right angles to each other. So as to prevent any interference between these rollers and in order to facilitate adjustment of the associated crank pin, these rollers are offset from each other. Also, for purposes of adjustment, the end of each crank pin at 42 may be hex-shaped for receiving a suitable wrench. Finally, for protecting the rollers against injury from external sources, each of the pair of support members 11 of each assembly is provided with a covering 43 suitably secured thereto by bolts 44.

Although in the above description, specific reference is made to the preferred embodiment of the present invention, it is to be understood that various changes may be made without departing from the scope of the invention as set forth in the following claims.

I claim:
1. An adjustable guide roller assembly for a telescopic boom having an outer boom member and an inner boom member telescopically positioned within said outer member comprising in combination with said boom:
   (a) support means attached to said outer boom member and having a pair of spaced journal openings disposed along a common predetermined axis;
   (b) a crank pin rotatably positioned in said journal openings for rotation about said predetermined axis with the intermediate portion of said crank pin disposed between said openings defining a cylindrical bearing support surface having an axis spaced from and parallel to said predetermined axis; said crank pin having a clamping surface adapted to frictionally engage a cooperating clamping surface on said outer boom;
   (c) a roller bearing rotatably positioned on said cylindrical support and extending inwardly of said outer boom member for bearing engagement with said inner boom member; and
   (d) selectively operable means frictionally securing said clamping surfaces together against movement with respect to each other about said predetermined axis and longitudinally thereof to hold said crank pin and roller bearing in various positions of rotation about said predetermined axis.

2. An adjustable guide roller assembly for a telescopic boom having an outer boom member and an inner boom member telescopically positioned within said outer member comprising in combination with said boom:
   (a) a pair of spaced support members fixed to said outer boom member and extending outwardly therefrom and having aligned journal openings therethrough;
   (b) a crank pin rotatably positioned in said journal openings for rotation about a predetermined axis and having a cylindrical bearing support surface disposed between said spaced support members on an axis parallel to and offset from said predetermined axis;
   (c) a roller bearing rotatably positioned on said bearing support surface and extending inwardly of said outer boom member in a direction transverse to a plane passing through the longitudinal axis of said outer boom member for bearing engagement with said inner boom member;
   (d) a radially projecting flange fixed to one end of said crank pin and having a surface facing one surface of one of said support members; and
   (e) selectively operable clamping means frictionally securing said flange and said one surface of said one support member together against relative movement about said predetermined axis and longitudinally thereof to hold said crank pin and roller bearing about said predetermined axis.

3. A telescopic boom assembly comprising:
   (a) an outer boom member;
   (b) an inner boom member telescopically positioned within said outer member; and (c) guide means fixed to said outer boom member at spaced points about its periphery and along its length for slidably engaging said inner boom member as the latter is moved longitudinally of said outer boom member, at least one of said guide means comprising:
  (1) a pair of spaced support members fixed to said outer boom member and extending outwardly therefrom and having aligned journal openings therethrough,
  (2) a crank pin rotatably positioned in said journal openings for rotation about a predetermined axis and having a cylindrical bearing support surface disposed between said spaced support members on an axis parallel to and offset from said predetermined axis,
  (3) a roller bearing rotatably positioned on said bearing support surface and extending inwardly of said outer boom member in a direction transverse to a plane passing through the longitudinal axis of said outer boom member for bearing engagement with said inner boom member,
  (4) a radially projecting flange fixed to one end of said crank pin and having a surface facing one surface of one of said support members, and
  (5) selectively operable clamping means for frictionally securing said flange to said one surface of said one support member in various positions of rotation of said roller bearing about said predetermined axis.

4. A telescopic boom assembly as set forth in claim 3 wherein said selectively operable clamping means comprises:
  (a) an annular member having a portion overlying a portion of said flange with the opening in said annular member spaced from said flange; and
  (b) a tension fastening element extending through the opening in said annular member and into said one support member for drawing said annular member toward said support member to releasably clamp said flange therebetween.

5. An adjustable guide roller assembly for a telescopic boom having an outer boom member and an inner boom member telescopically positioned within said outer member comprising in combination with said boom:
  (a) a pair of spaced support members fixed to said outer boom member and extending outwardly therefrom and having aligned journal openings therethrough;
  (b) a crank rotatably positioned in said journal openings for rotation about a predetermined axis and having a cylindrical bearing support surface disposed between said spaced support members on an axis parallel to and offset from said predetermined axis, said bearing support surface terminating adjacent one end of said crank pin in a radially projecting ledge facing the other end of said crank pin;
  (c) a roller bearing rotatably positioned on said bearing support surface and extending inwardly of said outer boom member in a direction transverse to a plane passing through the longitudinal axis of said outer boom member for bearing engagement with said inner boom member, said roller bearing comprising:
    (1) an annular roller,
    (2) An outer bearing race fixed in the opening of said roller for rotation therewith,
    (3) an inner bearing race loosely positioned on the cylindrical bearing support surface of said crank pin and having one end thereof abutting said ledge portion, and
    (4) a plurality of bearing elements disposed between said races;
  (d) a sleeve slidably received over said other end of the crank pin and rotatably supporting said other end in one of said support members;
  (e) tension fastening means connected to said other end of the crank pin for drawing said sleeve into compressional engagement with the other end of said inner race to clamp said inner race against said ledge; and
  (f) means for releasably securing said crank pin at various positions of rotation about said predetermined axis against movement relative to said support members.

6. An adjustable guide roller assembly as set forth in claim 5 wherein said last mentioned means includes:
  (a) a radially projecting flange fixed to said one end of the crank pin and having a surface facing one surface of said other support member; and
  (b) selectively operable clamping means for frictionally securing said flange to the one surface of said other support member at various positions of rotation of said roller bearing about said predetermined axis.

7. An adjustable guide roller assembly as set forth in claim 6 wherein said selectively operable clamping means comprises:
  (a) an annular member having a portion overlying a portion of said flange with the opening in said annular member spaced from said flange; and
  (b) a tension fastening element extending through the opening in said annular member and into said other support member for drawing said annular member toward said support member to releasably clamp said flange therebetween.

8. An adjustable guide roller assembly for a telescopic boom having an outer boom member and an inner boom member telescopically positioned within said outer member comprising in combination with said boom:
  (a) a pair of spaced support members fixed to said outer boom member and extending outwardly therefrom and having aligned journal openings therethrough;
  (b) a crank pin rotatably positioned in said journal openings for rotation about a predetermined axis and having a cylindrical bearing support surface disposed between said spaced support members on an axis parallel to and offset from said predetermined axis;
  (c) a roller bearing rotatably positioned on said bearing support surface and extending inwardly of said outer boom member in a direction transverse to a plane passing through the longitudinal axis of said outer boom member for bearing engagement with said inner boom member;
  (d) a radially projecting flange fixed to one end of said crank pin and having a surface facing one surface of one of said support members; and
  (e) selectively operable clamping means for frictionally securing said flange to said one surface of said one support member in various positions of rotation of said crank pin and roller bearing about said predetermined axis, said clamping means comprising.
    (1) an annular member having a portion overlying a portion of said flange with the opening in said annular member spaced from said flange; and
    (2) a tension fastening element extending through the opening in said annular member and into said one support member for drawing said annular member toward said support member to releasably clamp said flange therebetween.

References Cited by the Examiner

UNITED STATES PATENTS

| | | | |
|---|---|---|---|
| 3,035,663 | 5/1962 | Mehlmann | 187—9 |
| 3,076,558 | 2/1963 | Berquist et al. | 212—55 |
| 3,093,248 | 6/1963 | Winter | 212—55 |

HUGO O. SCHULZ, *Primary Examiner.*

UNITED STATES PATENT OFFICE
CERTIFICATE OF CORRECTION

Patent No. 3,285,431  November 15, 1966

Charles H. Butcher, Jr.

It is hereby certified that error appears in the above numbered patent requiring correction and that the said Letters Patent should read as corrected below.

Column 5, line 6, for "coopearting" read -- cooperating --; line 71, for "broad" read -- bored --; column 6, line 34, after "support" insert -- surface --; column 7, line 50, after "crank" insert -- pin --.

Signed and sealed this 12th day of September 1967.

(SEAL)
Attest:

ERNEST W. SWIDER
Attesting Officer

EDWARD J. BRENNER
Commissioner of Patents